United States Patent [19]

Lee

[11] Patent Number: 5,625,843
[45] Date of Patent: Apr. 29, 1997

[54] AUDIO DATA INPUT DEVICE FOR MULTI-MEDIA COMPUTER

[75] Inventor: Chang-ho Lee, Seoul, Rep. of Korea

[73] Assignee: Samsung Electronics Co., Ltd., Kyungki-do, Rep. of Korea

[21] Appl. No.: 330,725

[22] Filed: Oct. 28, 1994

[30] Foreign Application Priority Data

May 6, 1994 [KR] Rep. of Korea ............... 94-9937

[51] Int. Cl.$^6$ ................................ G06F 3/00; G10L 3/00
[52] U.S. Cl. .................................... 395/842; 395/2.1
[58] Field of Search .................... 395/2.1, 2.79, 395/2.87, 842, 871, 154, 155, 161; 381/122

[56] References Cited

U.S. PATENT DOCUMENTS

| | | | |
|---|---|---|---|
| 4,627,001 | 12/1986 | Stapleford et al. | 395/2.69 |
| 4,698,776 | 10/1987 | Shibata | 395/2.1 |
| 4,772,873 | 9/1988 | Duncan | 395/2.1 X |
| 4,890,259 | 12/1989 | Simko | 395/2.1 X |
| 5,297,231 | 3/1994 | Miller | 395/2.1 |
| 5,402,518 | 3/1995 | Lowery | 395/2.1 |

*Primary Examiner*—Glenn A. Auve
*Attorney, Agent, or Firm*—Leydig, Voit & Mayer

[57] ABSTRACT

An audio data input device in a multi-computer system converts an audio signal output from a microphone into digital audio data, and inputs to a computer system the audio data and the audio clock converted into a digital signal by employing a keyboard connector or a mouse connector of a computer system, to thereby simplify a computer system structure and obtain enhanced user convenience.

7 Claims, 7 Drawing Sheets

AUDIO DATA INPUT DEVICE FOR MULTI-MEDIA COMPUTER

BACKGROUND OF THE INVENTION

The present invention relates to an audio data input device for a multi-media computer, and more particularly, to an audio data input device for converting an audio signal input to a microphone into a digital signal and for inputting the digital signal to a computer system via a connector of a keyboard or a mouse.

Generally, in a computer system, when an audio message, for example, a user's voice, is utilized as information, an audio card and a microphone are additionally needed. At this time, when a microphone is used, a microphone has to be operated separately, while a record switch (for example, a software-generated panel such as in the Windows® software by Microsoft) is clicked by a pointing device such as a mouse. Thus, a time interval between the clicking time and an actual recording time occurs. Accordingly, a file size is enlarged, which is unnecessary.

In addition, when installing a system, lines of a microphone and a mouse are entangled, which causes considerable inconveniences for system usage.

SUMMARY OF THE INVENTION

Accordingly, it is an object of the present invention to provide an audio data input device for processing the audio signal input via a microphone included in a keyboard or a mouse by employing a keyboard connector or a mouse connector of the conventional multi-media computer system so as to simplify a system constitution, and for removing signal process problems caused by a system's printed circuit board design and an analog signal distortion.

To accomplish the object of the present invention, there is provided an audio data input device for a multi-media computer system having a keyboard or a mouse as data input means, the audio data input device comprising:

an audio data transmitting portion for converting the audio signal output from a microphone of the keyboard or mouse into digital audio data, and for transmitting the digital audio data together with an audio clock signal via a connector of the keyboard or mouse; and an audio data receiving portion for converting the digital audio data and audio clock signal transmitted by the audio data transmitting portion into parallel digital audio data and a parallel audio clock signal, and for transmitting the parallel digital audio data and audio clock signal to a memory of the computer system by employing a direct memory access (DMA) function.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be explained in more detail with reference to the attached drawings.

Figure 1:
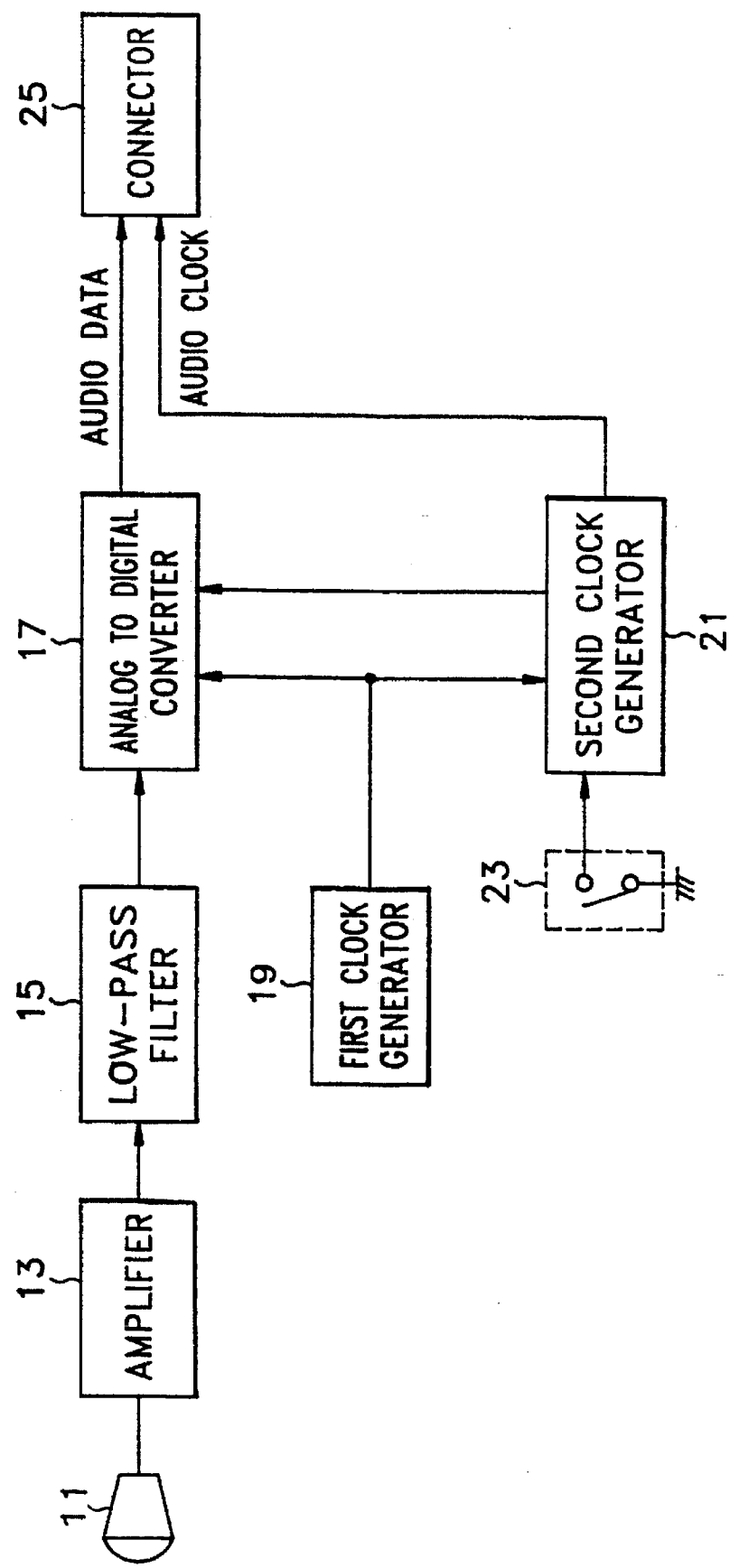
FIG. 1 is a block diagram showing an audio data transmitting portion provided for a keyboard or a mouse among the components of an audio data input device of the present invention.

FIG. 1 is a block diagram showing an audio data transmitting portion provided for a keyboard or a mouse among the components of an audio data input device of the present invention.

The audio data transmitting portion of FIG. 1 includes a microphone 11 for converting an externally supplied sound input into an electrical audio signal, an amplifier 13 for amplifying the audio signal output from microphone 11 to a predetermined level, a low-pass filter 15 for removing a high frequency noise component from the output signal of amplifier 13, an analog-to-digital converter 17 for converting an analog audio signal output from low-pass filter 15 into digital audio data, a first clock generator 19 for generating a converting clock of analog-to-digital converter 17, a second clock generator 21 for generating an audio clock signal from the converting clock of analog-to-digital converter 17 output from first clock generator 19 and for providing an enable signal to the analog-to-digital converter, a switch 23 for controlling an operation of second clock generator 21 and analog-to-digital converter 17, and a connector 25 for transmitting the serial digital audio data output from analog-to-digital converter 17 and the serial audio clock signal output from second clock generator 21.

Figure 2A:
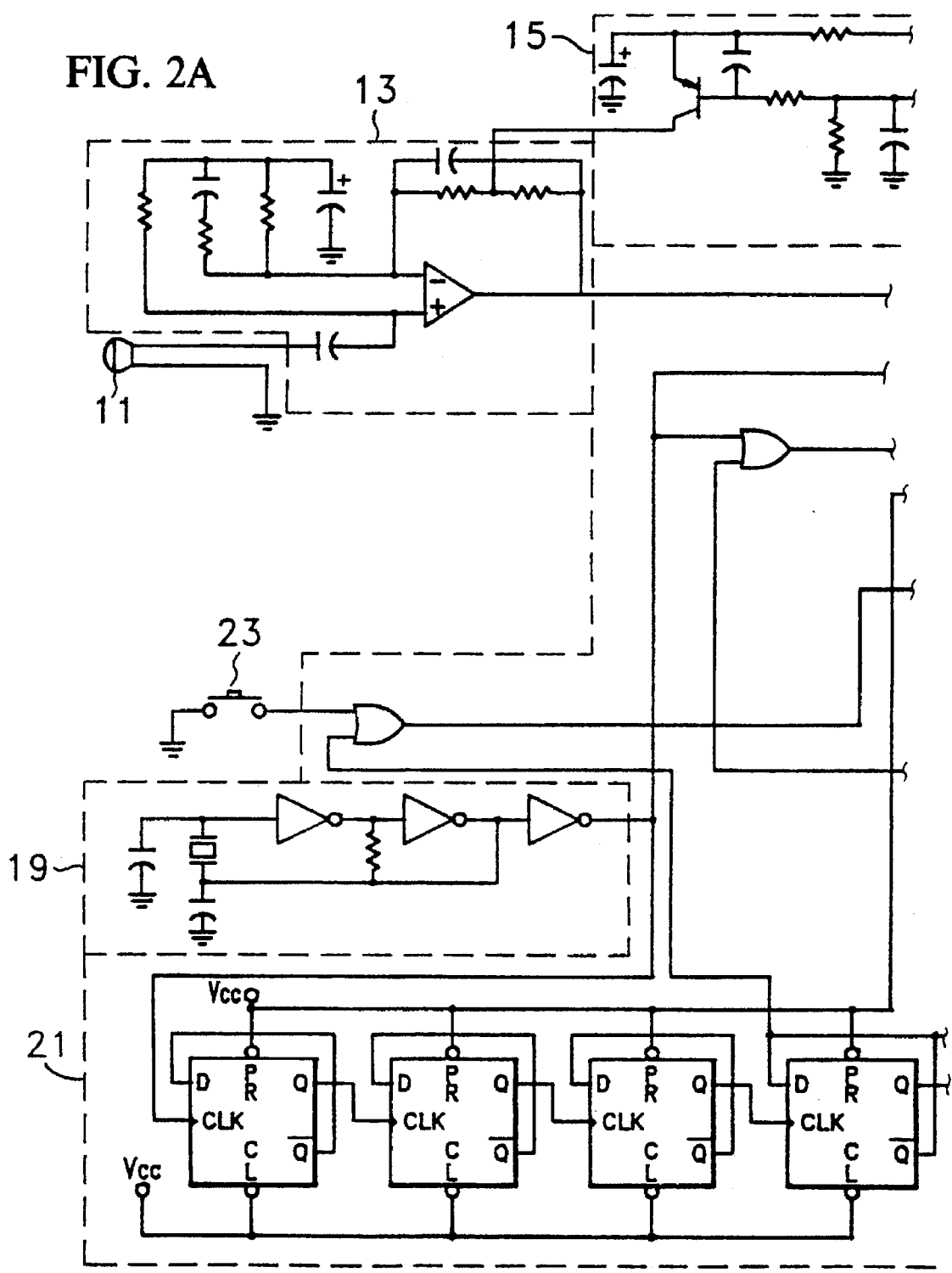
FIGS. 2A and 2B are a detailed circuit view of an embodiment of the audio data transmitting portion shown in FIG. 1.
Figure 2B:
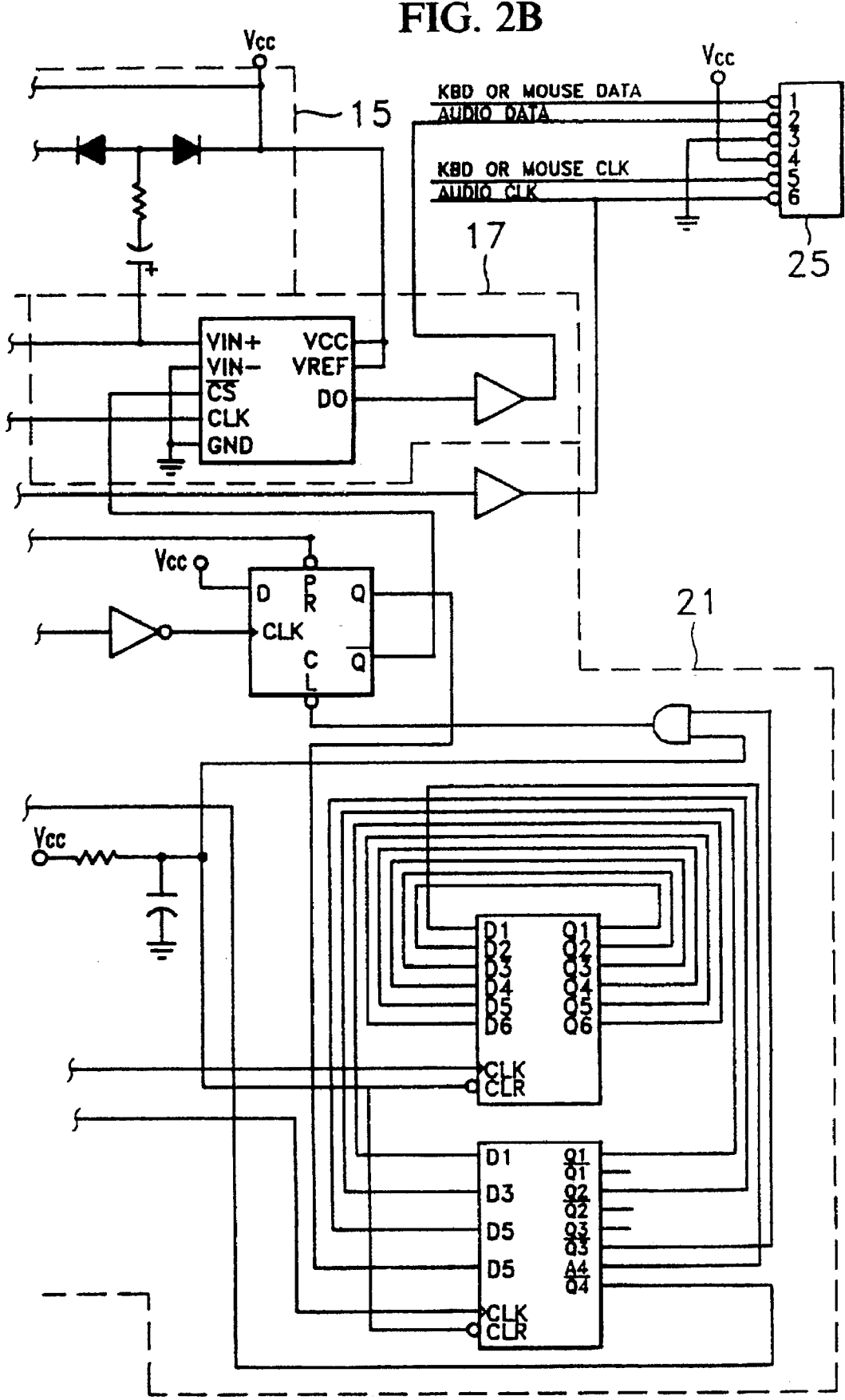

FIGS. 2A and 2B are, together a detailed circuit view of an embodiment of the audio data transmitting portion shown in FIG. 1. The same reference numerals of FIGS. 2A and 2B denote like components of FIG. 1.

Figure 3:
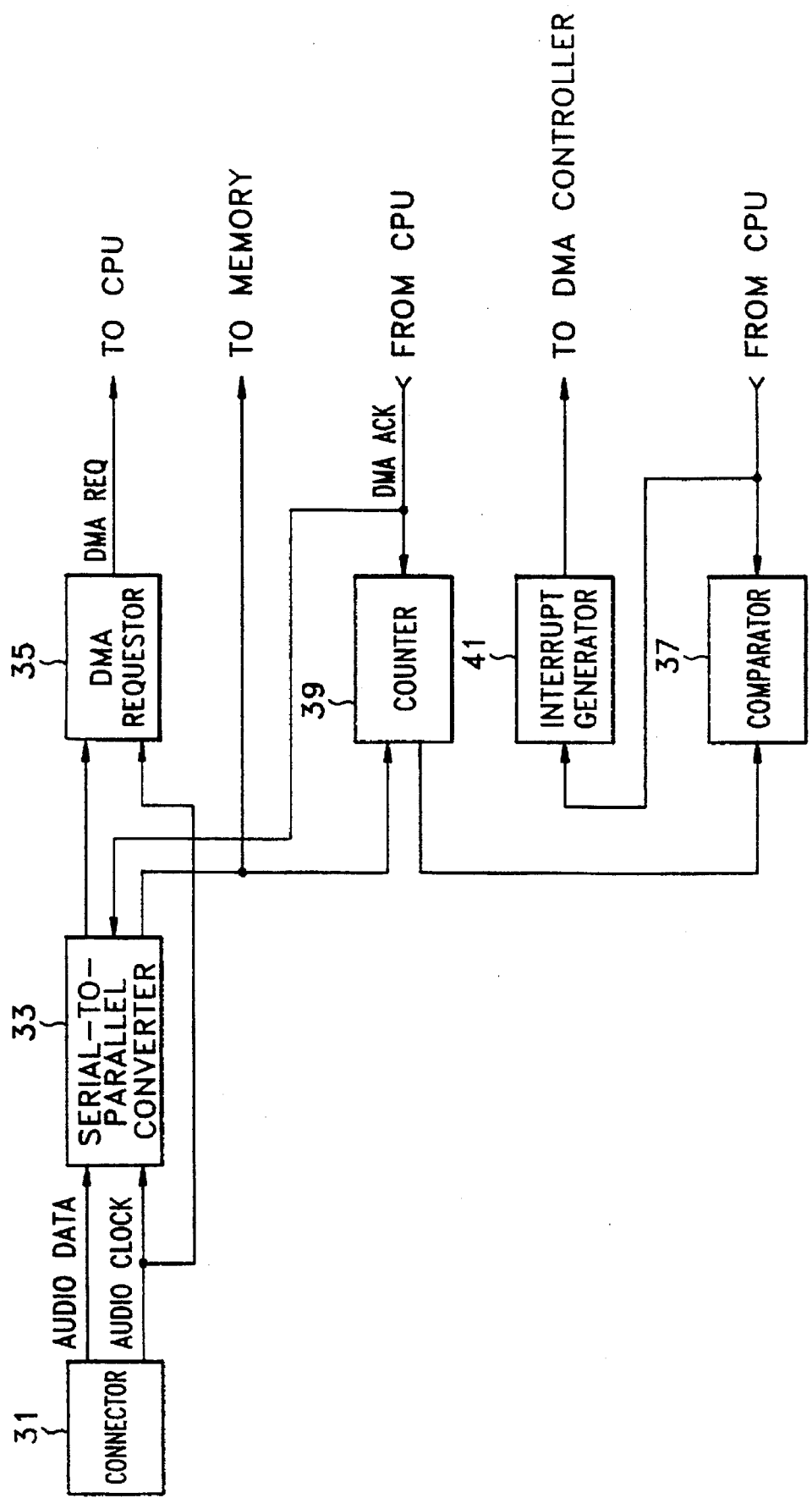
FIG. 3 is a block diagram showing an audio data receiving portion provided for a computer system among the components of an audio data input device of the present invention.

FIG. 3 is a block diagram showing an audio data receiving portion provided for a computer system among the components of an audio data input device of the present invention.

The audio data receiving portion shown in FIG. 3 includes a connector 31 for receiving serial digital audio data and a serial audio clock signal which are transmitted from connector 25 of the audio data transmitting portion, a serial-to-parallel converter 33 for converting the serial audio data and the serial audio clock signal received by connector 31 into parallel audio data and a parallel audio clock signal and for shifting the parallel audio data to a memory of a computer system, a DMA requestor 35 for generating direct memory access request (DMA REQ) signal by a predetermined bit signal output from serial-to-parallel converter 33 and for supplying the generated signal to a CPU (not shown), a counter 37 for counting the parallel audio data output from serial-to-parallel converter 33 by using the DMA acknowledge (DMA ACK) signal generated with respect to the DMA request signal as a clock signal, a comparator 39 for comparing the value counted by counter 37 with the reference count value predetermined by CPU, and an interrupt generator 41 for generating an interrupt signal when the reference count value is equals to the count value output from counter 37 in the comparison done by comparator 39 and for supplying the interrupt signal to a DMA controller (not shown) with the interrupt signal.

Figure 4A:
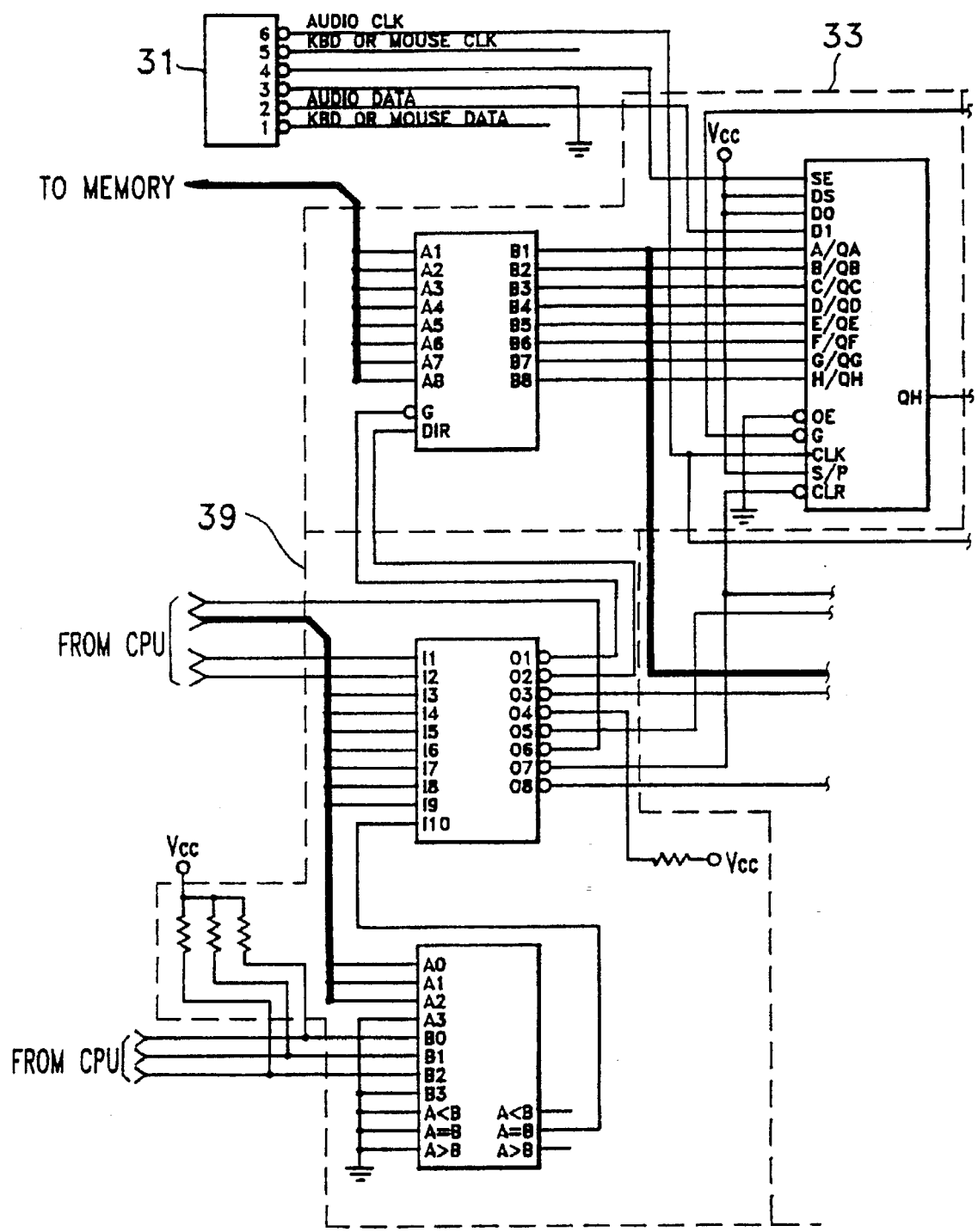
FIGS. 4A and 4B are a detailed circuit view of an embodiment of the audio data receiving portion shown in FIG. 3.
Figure 4B:
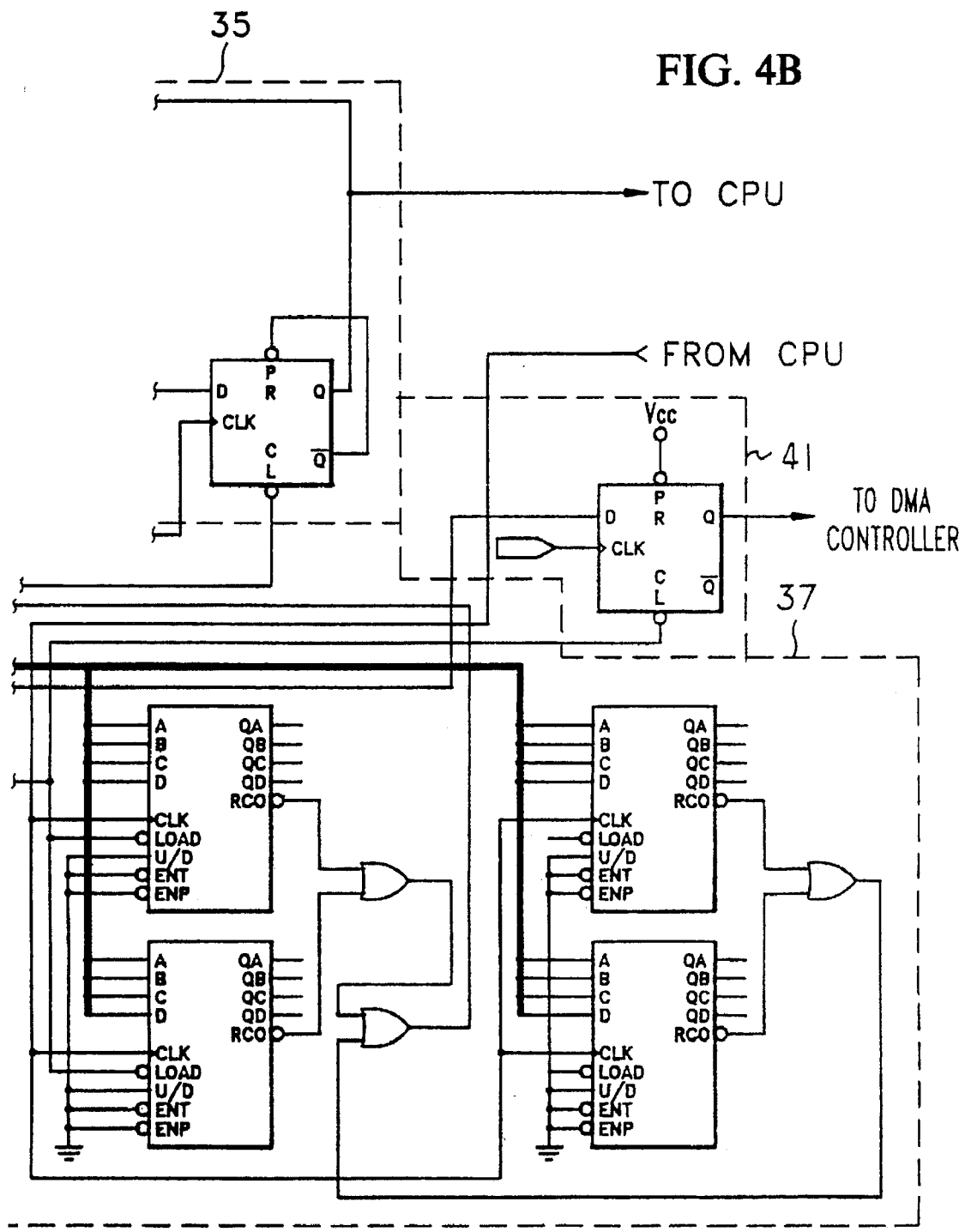

FIGS. 4A and 4B are, together, is a detailed circuit view according to an embodiment of the audio data transmitting portion shown in FIG. 3. The same reference numerals of FIGS. 4 and 4B indicate like components of FIG. 3.

Figures 5A, 5B, 5C, 5D, 5E, 5F, 5G, 5H:
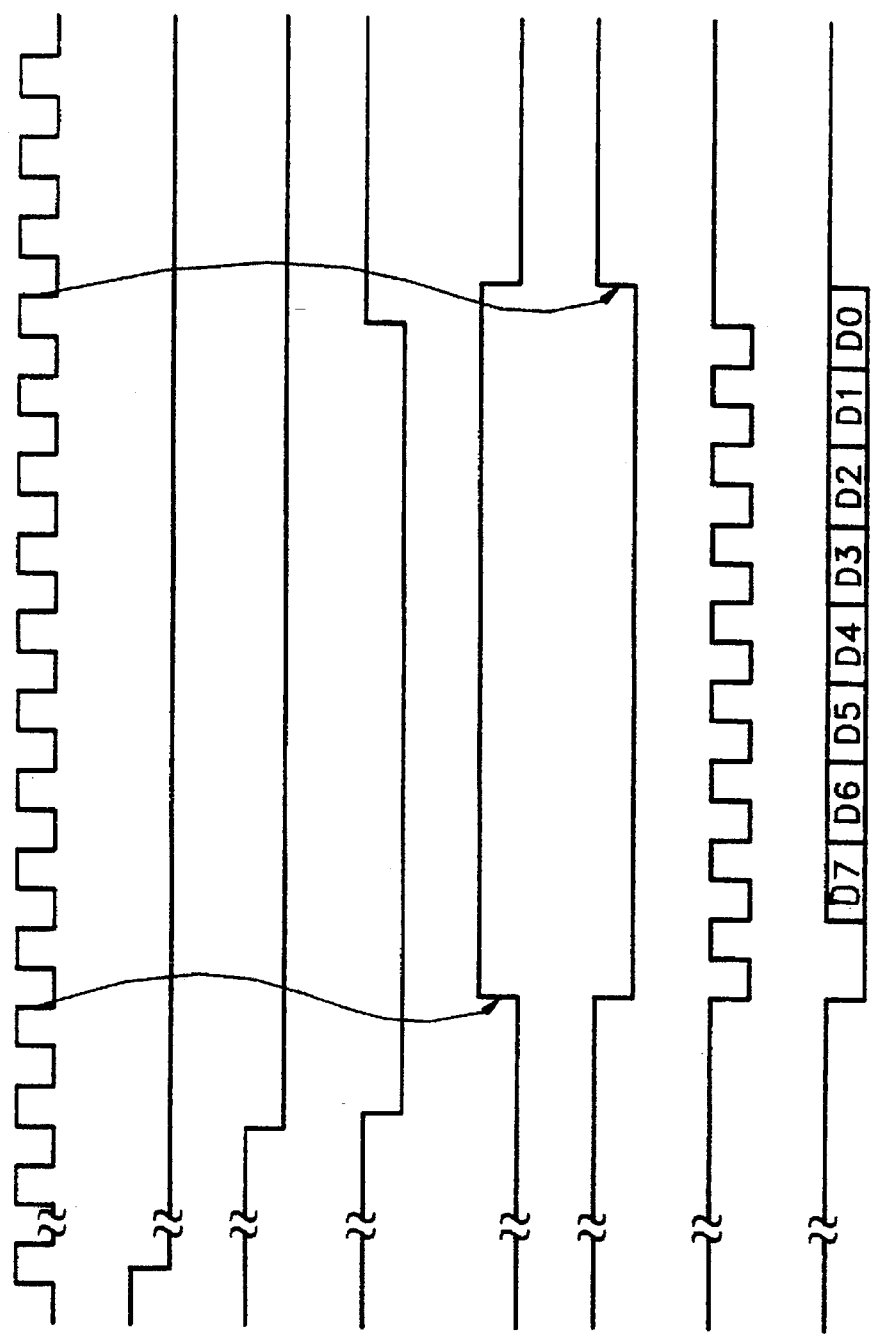
FIGS. 5A to 5H illustrate an operational timing diagram of various portions of FIGS. 2A and 2B.

FIGS. 5A to 5H illustrate an operational timing diagram of various portions of FIG. 1 and FIG. 2. FIG. 5A illustrates a converting clock signal output from first clock generator 19 and input to analog-to-digital converter 17. FIG. 5B illustrates an output signal of a switch 21. FIG. 5C illustrates a converting cycle of analog-to-digital converter 17. FIG. 5D illustrates an enable signal of analog-to-digital converter 17 output from second clock generator 23. FIG. 5E illustrates a clock enable signal generated from second clock generator 23. FIG. 5F illustrates an inverted clock enable signal. FIG. 5G illustrates an audio clock signal output from second clock generator 23. FIG. 5H illustrates audio data output from analog-to-digital converter 17.

The operation of the present invention will be explained with reference to FIG. 1 through FIG. 5.

Referring to the audio data transmitting portion shown in FIG. 1 and FIGS. 2A and 2B, microphone 11 converts the sound, for example, a user's voice provided externally, into an electrical audio signal, and applies the electrical audio signal to amplifier 13.

The audio signal output from microphone 11 is amplified to a predetermined level in amplifier 13, and low-pass filter 15 removes the high frequency noise component from the output signal of amplifier 13, and applies the result to analog-to-digital converter 17.

Analog-to-digital converter 17 converts the analog audio signal output from low-pass filter 15 into the digital audio data (shown in FIG. 5H). Then, the result is provided to an unused pin among the pins of connector 25. Here, the digital audio data is constituted by nine serial bits including a start bit (the first bit).

First clock generator 19 generates a converting clock, for example, a 176.4 KHz clock (FIG. 5A), employed for analog-to-digital conversion, and applies the result to analog-to-digital converter 17. Here, a 11.025 KHz signal (FIG. 5C), which is a multi-media PC specification of Microsoft, is used as a converting cycle. However, 22.05 KHz or 44.1 KHz may be used depending on the case.

Second clock generator 21 generates an audio clock signal (FIG. 5G) from the converting clock of analog-to-digital converter 17 output from first clock generator 19 and provides the result to the unused pin of connector 25. In addition, second clock generator 21 generates an enable signal (FIG. 5D) and applies the enable signal to analog-to-digital converter 17.

Switch 23 is for controlling operations of analog-to-digital converter 17 and second clock generator 21. When switch 23 is turned on, second clock generator 21 operates by the output signal (FIG. 5B) of switch 23.

Connector 25 transmits the serial digital audio data (FIG. 5H) output from analog-to-digital converter 17 and the serial audio clock signal (FIG. 5G) output from second clock generator 21 to an audio data receiving portion.

Referring to the audio data receiving portion shown in FIG. 3 and FIGS. 4A and 4B, connector 31 receives the serial digital audio data and the serial audio clock signal transmitted from the connector (reference numeral 25 of FIG. 1 and FIG. 2) of the audio data receiving portion. For the general personal computer system, connectors 25 and 31 are generally 6-pin connectors. Here, the serial digital audio data and the serial audio clock signal are transmitted and received via two unused pins among the six pins.

Serial-to-parallel converter 33 converts the serial audio data and the audio clock signal received via connector 31 into parallel audio data and an audio clock signal, and shifts the parallel audio data to a memory (not shown) of the computer system. The shifting operation is paused until the CPU generates a DMA acknowledge signal with respect to the DMA request signal generated by DMA requestor 35.

DMA requestor 35 generates the DMA request signal (DMA REQ) by a predetermined bit output from serial-to-parallel converter 33, i.e., the start bit, and applies the DMA request signal to the CPU (not shown).

Counter 37 counts the parallel audio data output from serial-to-parallel converter 33 by employing the DMA acknowledge (DMA ACK) signal generated with respect to the DMA request signal as a clock signal.

Comparator 39 compares the count value output from counter 37 with the reference count value predetermined by the CPU and provides interrupt generator 41 with a comparison signal indicating whether the comparison result of the above two values are equal.

interrupt generator 41 generates an interrupt signal when the count value output from counter 37 is equal to the reference count value predetermined by the CPU, in order to set the new range in the DMA controller (not shown) if the DMA function needs a higher capacity than the predetermined capacity, say, 64 Kb.

As described above, in a multi-media computer system, an audio data input device of the present invention enables converting an audio signal output from the microphone into a digital signal. Then, the audio data and the audio clock converted into a digital signal, respectively are input to a computer system by employing the unused pin of a keyboard connector or a mouse connector. Thus, the problem that an analog signal processing is required in a computer system board is solved, thereby obtaining correct audio data which is required by a multi-media computer system.

In addition, computer system structure can be simplified and enhanced user convenience can be obtained.

What is claimed is:

1. An audio data input device for a multi-media computer system having a memory and a keyboard or a mouse as data input means, the audio data input device comprising:

a microphone for converting input sound into an audio signal;

an audio data transmitting portion for converting the audio signal into digital audio data and for transmitting the digital audio data together with an audio clock signal via a connector of the keyboard or mouse; and an audio data receiving portion for converting the digital audio data into parallel digital audio data and for transmitting the parallel digital audio data and the audio clock signal to the memory employing a direct memory access (DMA) function wherein the audio data transmitting portion comprises an analog-to-digital converter for converting the audio signal into the digital audio data;

a first clock generator for generating a converting clock signal for the analog-to-digital converter;

a second clock generator for generating an audio clock signal from the converting clock signal; and a connector for transmitting the digital audio data and the audio clock signal.

2. The audio data input device according to claim 1, wherein the audio data transmitting portion comprises a switch for controlling the second clock generator and the analog-to-digital converter.

3. An audio data input device for a multi-media computer system having a memory and a keyboard or a mouse as data input means, the audio data input device comprising:

a microphone for converting input sound into an audio signal;

an audio data transmitting portion for converting the into digital audio data and for transmitting the digital audio data together with audio clock signal via a connector of the keyboard or mouse; and an audio data receiving portion for converting the digital audio data into parallel digital audio data and for transmitting the parallel digital audio data and the audio clock signal to the memory employing a direct memory access (DMA) function wherein the audio data receiving portion comprises:

a connector for receiving the digital audio data and the audio clock signal;

a serial-to-parallel converter for converting the audio signal to parallel audio data and for shifting the parallel audio data into the memory;

a DMA requestor for generating a DMA request signal in response to a bit output by the serial-to-parallel converter;

a counter for counting the parallel audio data output from the serial-to-parallel converter, employing a DMA acknowledge signal generated with respect to the DMA request signal as a clock signal;

a comparator for comparing a count output from the counter with a reference count; and an interrupt generator for generating an interrupt signal when the count output from the counter, as compared by the comparator, equals the reference count.

4. The audio data input device according to claim 3, wherein the serial-to-parallel converter delays shifting the parallel audio data until the DMA acknowledge signal is generated.

5. The audio data input device according to claim 3, wherein the bit output from the serial-to-parallel converter is a start bit for analog-to-digital conversion of the audio signal in the-audio data transmitting portion.

6. An audio data input device for a multi-media computer system comprising:

a keyboard;

a microphone for outputting an analog audio signal, a circuit for receiving, amplifying, filtering, and converting the audio signal into digital audio data, and for outputting the digital audio data serially in synchronization with an audio clock signal, and a connector having at least two pins for respectively outputting the digital audio data and the audio clock signal; and a computer, coupled to the keyboard, including a memory, an audio data receiving portion for receiving the digital audio data and the audio clock signal, for converting the digital audio data into parallel data, and direct memory access means for transferring the parallel data into the memory.

7. An audio data input device for a multi-media computer system comprising:

a mouse;

a microphone for outputting an analog audio signal, a circuit for receiving, amplifying, filtering, and converting the audio signal into digital audio data, and for outputting the digital audio data serially in synchronization with an audio clock signal, and a connector having at least two pins for respectively outputting the digital audio data and the audio clock signal; and a computer, coupled to the mouse, including a memory, an audio data receiving portion for receiving the digital audio data and the audio clock signal, for converting the digital audio data into parallel data, and direct memory access means for transferring the parallel data into the memory.

* * * * *

UNITED STATES PATENT AND TRADEMARK OFFICE
CERTIFICATE OF CORRECTION

PATENT NO. : 5,625,843
DATED : April 29, 1997
INVENTOR(S) : Lee

It is certified that error appears in the above-identified patent and that said Letters Patent is hereby corrected as shown below:

Column 5, Line 3, after "the" insert --audio signal--;

Line 5, after "with" insert --an--;

Line 37, after "the" delete -- - --.

Signed and Sealed this

Twelfth Day of August, 1997

Attest:

BRUCE LEHMAN

Attesting Officer

Commissioner of Patents and Trademarks